L. D. DAVIS.
MACHINE FOR REDUCING THE WALLS OF TUBULAR BILLETS AND FOR OTHER USES.
APPLICATION FILED AUG. 29, 1908.
928,946.
Patented July 27, 1909.
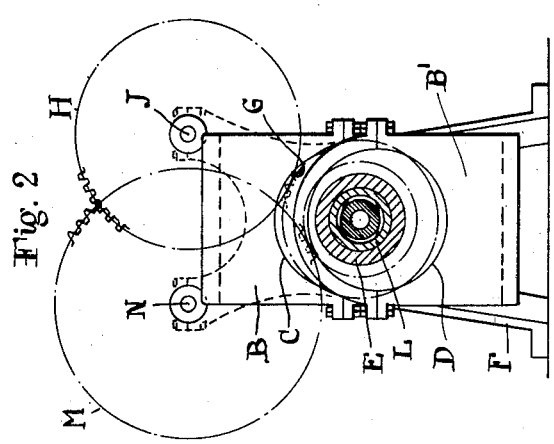
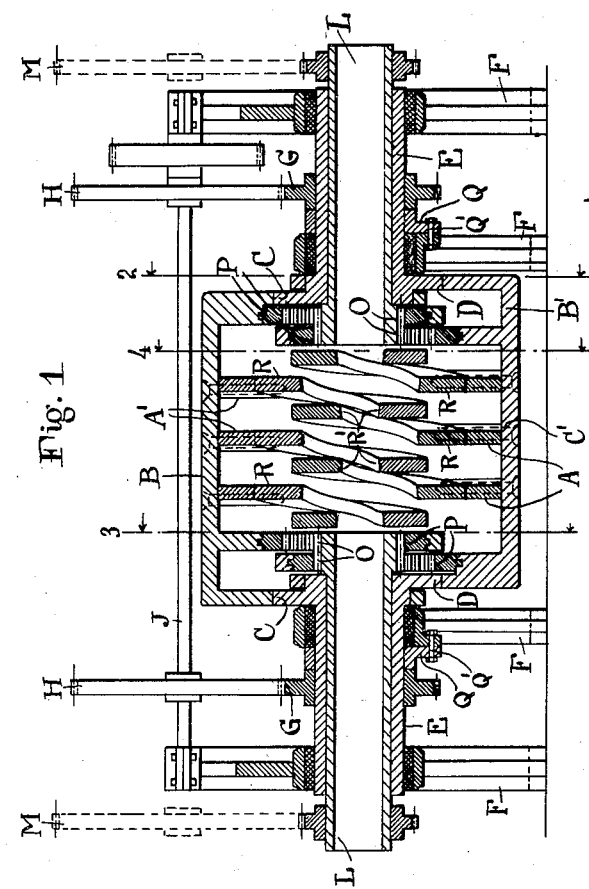
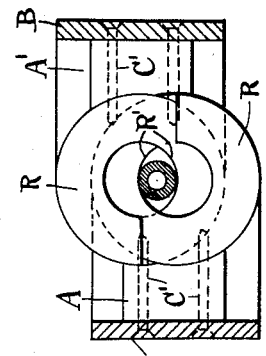
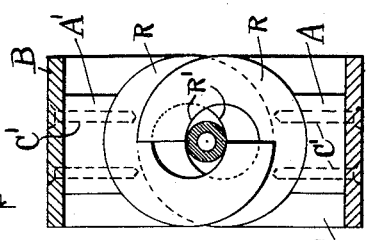
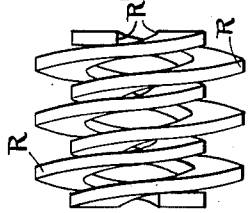
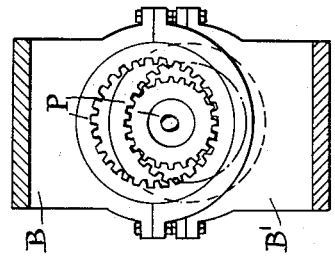
Witnesses
Inventor
Leonard D. Davis,
By his Attorneys
Burney & Ogden

UNITED STATES PATENT OFFICE.

LEONARD D. DAVIS, OF ERIE, PENNSYLVANIA.

MACHINE FOR REDUCING THE WALLS OF TUBULAR BILLETS AND FOR OTHER USES.

No. 928,946.　　　　Specification of Letters Patent.　　　Patented July 27, 1909.

Application filed August 29, 1908. Serial No. 450,830.

To all whom it may concern:

Be it known that I, LEONARD D. DAVIS, a citizen of the United States, residing at Erie, Pennsylvania, have invented certain new and useful Improvements in Machines for Reducing the Walls of Tubular Billets and for other Uses, of which the following is a specification, illustrated by drawings.

The invention relates to mechanism particularly applicable to cross-rolling bodies in a heated state either to pierce them upon mandrels in a converging and then diverging pass, or to reduce the diameter or the wall thickness of billets or tubes or for other analogous purposes involving transverse rolling.

The mechanism is capable of having at will a combined orbital and rotatory movement of the faces or members that act upon the tubes or bodies that are to be treated, the orbital motion being about the axis of the pass as a center and the rotatory motion being about a center or centers that is or are not coincident with the axis of the pass. The mechanism also embodies means for controlling the components of the motion and means for stopping one of the components while continuing the other. When the two components occur in opposite directions the combined effect on the tube or body is aggregative so that a given speed of action on the body may be produced with much less rotary speed of each of the two components of motion than could be produced by simple rotatory motion of speed equal to one of these components. The mechanism also embodies means whereby the billet, blank, or tube is rolled by concave instead of convex rolling surfaces and is therefore more closely confined or compressed laterally during the rolling.

The objects of the invention are to improve and simplify such mechanism and to improve the rolling action to which the metal is subjected and effect the desired change in the body being rolled with the least harmful strains or working of the metal.

For reeling or for reducing the wall thickness of tubes or bars the pass of the machine will be understood to be gradually and gently convergent toward the rear end while for piercing it should be convergent and then toward the rear end divergent. In the accompanying drawing the machine is shown as proportioned for reducing the diameter or wall thickness of rods and tubes.

In the drawings Figure 1 is a central longitudinal section on the axis of the pass. Fig. 2 is a transverse section on the plane 2—2 of Fig. 1. Figs. 3 and 4 are cross sectional detail views on the planes 3—3 and 4—4 of Fig. 1. Fig. 5 is a cross section of the housings shown in Fig. 4 rotated ninety degrees from the position shown in Fig. 4. Fig. 6 is a detail side view of the coil shaped dies.

At B B' are shown two housings which are mounted to severally rotate upon the pairs of eccentrics C C and D D. These eccentrics are mounted upon and turn with the hollow sleeves E which are journaled in the fixed frame or supports F of the machine. These hollow sleeves E are coaxial with the pass of the machine and they are driven by gears G, H, from the common counter-shaft J which in turn is driven at will from any suitable source of power. Within the sleeves E are concentrically journaled the tubular shafts L which are turned by gears shown on their outer ends meshing with gears M on a counter-shaft N (Fig. 2) which is also driven from a suitable source of power at will. Consequently the sleeves E act in unison and the sleeves L act in unison. The sleeves or hollow shafts L carry spur gears O which mesh with the internally toothed gears P rigidly secured to the respective housings B B'. Rotation of the gears O causes the housings to rotate upon their eccentrics C and D while on the other hand the eccentrics with their hollow sleeves E may be rotated at such speed and in such direction as to prevent rotation of the housings, but this would produce an orbital movement of each housing in a small circular path the radius of which is of course the eccentricity of the eccentric relative to the axis of the pass. Either the inner or the outer sleeves may be held stationary while the others are rotated, and I have shown a special means for holding the outer sleeves against rotation consisting of collars Q rigid on the shafts L and each having a removable pin Q' for connecting it to the framework of the machine so the sleeve cannot rotate. Many other means such as holding the counter-shafts from rotating may be substituted.

Within each housing are carried the working faces that act upon the billet or tube in the pass. It is highly desirable that these working faces shall lie opposite each other, to prevent bending strains on the billet or tube and I have devised means whereby the revoluble housings may be provided with a plurality of working faces lying opposite each other. In order to accomplish this object, I form the working faces out of helices R, having the convolutions of one helix interspaced with those of the other, so that the working faces R' fall opposite each other.

The helices may be formed in any suitable manner and one way of making them is to cut a coarse pitch upon a cylindrical piece of round steel, thus leaving a solid center which is then bored out, resulting in a true coil or helix of uniform pitch. This helix is then cut or severed into two and one part screwed into the other, so that one helix is interjacent of the other. The desired degree of convergence of the inlet end of the pass and the divergence of the exit end when a piercing or expanding mandrel is to be used, is produced by tapering the bore of each helix.

The helices R are mounted on blocks A' in the housings, which blocks are suitably secured to the housings as by means of the bolts C', and the coils or helices are so adjusted and separated radially that the opening through the center between the faces R' forming the pass, will be of suitable size. The faces or cylindrical surfaces R' in the members R are coaxial (except for the convergence mentioned) with their respective eccentrics C or D upon which the housing is mounted. If the working faces R' were set slightly eccentric if desired with the centers of the eccentrics C or D then a slight radial or swaging movement between them and the billet will be produced as the housing is rotated. It will also be understood that a similar swaging effect can also be produced if the surfaces instead of being truly circular are polygons with many sides. Where they are truly convergent but concentric, a substantially perfect and pure rolling effect is produced and it will be understood that from the front to the narrowest part of the pass these wearing faces progressively encroach more and more on the pass so as to act progressively on the tube or other body that is being operated upon. For straightening bars or tubes in a cold state the difference may not exceed a thirty-second of an inch throughout the pass.

The application of the mechanism is as follows: When the inner sleeves only are rotated and the outer sleeves and eccentrics held stationary, each housing rotates on its individual axis, which is the center of the eccentrics on which it is mounted, and during such rotation the inner or rolling surfaces of each die rolls upon the surface of the tube, as will be apparent from a study of Figs. 4 and 5, wherein a change of angular position of ninety degrees of each of the housings is illustrated, assuming the eccentrics to be stationary. If the die surfaces are concentric with the two eccentrics of the housing, true rolling effect is produced without swaging. Eccentricity of the die surface will necessarily produce a swaging action. The billet or tube, with or without a mandrel, is thrust into the pass in the usual way and is fed forward by the application of a longitudinal force in any way desired. The tube or bar, as soon as it is gripped by the first three dies, spins rapidly and is operated upon by the equal application of the rolling forces at opposite sides. If, now, the housings are not allowed to turn and the outer sleeves E are driven to rotate the eccentrics an orbital movement of the housings about the axis of the pass, corresponding to the orbital movement of the eccentrics, will take place. Absence of rotation however will not be produced by holding the gears O stationary but they may be rotated at a speed and in a direction which will just overcome the tendency to cause rotation of the housings by the orbital movement. Preferably, however, both the orbital movement and the rotary movement are employed simultaneously, giving to each housing a motion partaking of both these components. If the sleeves are rotated in opposite directions an aggregate combined effect is produced, giving a high rolling speed effect with only about one half the speed of rotation of any one of the rotary parts as compared with the speed that would be required to act on all sides of the tube the same number of times by the rotation of the housing only.

It will be understood that the proportions of the machine will be widely varied for various uses to which the mechanism may be put, and that for swaging and reducing the thickness of wall of tubes in a heated state various appropriate shapes of the die surfaces will be utilized. I wish to protect the new mechanism as applicable to any and all uses with the appropriate and obvious variations in form and proportion of the parts therefor. The pitch of the core or helix may be uniform or increasing, and if desired, the throw of the eccentrics may be varied by any well-known means.

I claim and desire to obtain by Letters Patent the following:

1. A machine for cross rolling cylindrical bodies and other uses, having a plurality of revoluble housings and eccentrics on which the said housings turn, the centers of the eccentrics for one housing being out of line with those for the other housing, means for revolving the housings upon the eccentrics, means for revolving the eccentrics, and interspaced helices carried by the housings for acting on the body to be treated, said helices having openings extending longitudinally therethrough, the walls of which form the working portions of the helices, the helices being lapped by each other a sufficient amount to form a working pass between opposing working portions.

2. A machine for cross rolling cylindrical bodies and other uses, having a plurality of revoluble housings and eccentrics on which the said housings turn, the centers of the eccentrics for one housing being out of line with those for the other housing, means for revolving the housings upon the eccentrics, means for revolving the eccentrics adapted to be used at one time, means for holding the eccentrics stationary adapted to be used at another time, and interspaced helices carried by the housings for acting on the body to be treated, said helices having openings extending longitudinally therethrough, the walls of which form the working portions of the helices, the helices being lapped by each other a sufficient amount to form a working pass between opposing working portions.

3. A machine for cross rolling cylindrical bodies and other uses, having a plurality of revoluble housings and eccentrics on which the said housings turn, the centers of the eccentrics for one housing being out of line with those for the other housing, rotary hollow sleeves connected to rotate the eccentrics and the housings respectively, and mounted coaxially with the pass, means for actuating said sleeves, and interspaced helices carried by the housings for acting on the body to be treated, said helices having openings extending longitudinally therethrough, the walls of which form the working portions of the helices, the helices being lapped by each other a sufficient amount to form a working pass between opposing working portions.

4. A machine for cross rolling cylindrical bodies and other uses, having a plurality of revoluble housings and eccentrics on which the said housings turn, the centers of the eccentrics for one housing being out of line with those for the other housing, interspaced helices carried by the housings for acting on the body to be treated, said helices having openings extending longitudinally therethrough, the walls of which form the working portions of the helices, the helices being lapped by each other a sufficient amount to form a working pass between opposing working portions, hollow sleeves for carrying and actuating the said eccentrics, hollow sleeves connected for actuating the housings, and means for actuating the sleeves.

5. A machine for cross rolling cylindrical bodies and other uses, having a plurality of housings and interspaced helices carried thereby for acting upon the body to be treated, said helices having openings extending longitudinally therethrough, the walls of which form the working portions of the helices, the helices being lapped by each other a sufficient amount to form a working pass between opposing working portions, eccentrics disposed at different angular positions relatively to the axis of the pass of the machine, and upon which the housings are mounted to turn, and means for driving the respective housings upon the said eccentrics.

6. A machine for cross rolling cylindrical bodies and other uses, having a plurality of housings and interspaced helices carried thereby for acting upon the body to be treated, said helices having openings extending longitudinally therethrough, the walls of which form the working portions of the helices, the helices being lapped by each other a sufficient amount to form a working pass between opposing working portions, eccentrics disposed at different angular positions relatively to the axis of the pass of the machine and upon which the housings are mounted to turn, means for driving the respective housings upon the said eccentrics, and means for revolving the eccentrics about the axis of the pass as a center.

7. A machine for cross rolling cylindrical bodies and other uses, having a plurality of housings and interspaced helices carried thereby for acting upon the body to be treated, said helices having openings extending longitudinally therethrough, the walls of which form the working portions of the helices, the helices being lapped by each other a sufficient amount to form a working pass between opposing working portions, eccentrics disposed at different angular positions relatively to the axis of the pass of the machine and upon which the helices are mounted, and means for revolving the eccentrics about the axis of the pass and relatively to the housings, whereby an orbital movement is given to the housings.

8. In a machine for cross rolling cylindrical bodies and other uses, the combination of a plurality of revoluble housings and dies comprising interspaced helices carried by the housings for acting on the body to be treated, said helices having openings extending longitudinally therethrough, the walls of which form the working portions of the helices, the helices being lapped by each other a sufficient amount to form a working pass between opposing working portions.

9. Dies for a machine for cross rolling cylindrical bodies and other uses, comprising interspaced helices, said helices having openings extending longitudinally therethrough, the walls of which form the working portions of the helices, the helices being lapped by each other a sufficient amount to form a working pass between opposing working portions.

10. Dies for a machine for cross rolling cylindrical bodies and other uses, comprising two helices having their convolutions interspaced, said helices having openings extending longitudinally therethrough, the walls of which form the working portions of the helices, the helices being lapped by each other a sufficient amount to form a working pass between opposing working portions.

11. Dies for a machine for cross rolling cylindrical bodies and other uses, comprising two helices having the convolutions of one helix spaced between those of the other, said helices having openings extending longitudinally therethrough, the walls of which form the working portions of the helices, the helices being lapped by each other a sufficient amount to form a working pass between opposing working portions.

12. In a machine for cross rolling cylindrical bodies and other uses, the combination of a plurality of revoluble housings, dies comprising interspaced helices carried by the housings for acting on the body to be treated, said helices having openings extending longitudinally therethrough, the walls of which form the working portions of the helices, the helices being lapped by each other a sufficient amount to form a working pass between opposing working portions, means for revolving the housings about the axis of the pass, and means for imparting orbital motion to the housings about the axis of the pass.

13. In a machine for cross rolling cylindrical bodies and other uses, the combination of a plurality of revoluble housings, dies comprising interspaced helices carried by the housings for acting on the body to be treated, said helices having openings extending longitudinally therethrough, the walls of which form the working portions of the helices, the helices being lapped by each other a sufficient amount to form a working pass between opposing working portions and means for simultaneously imparting both rotatory and orbital motion to the housings about the axis of the pass.

14. In a machine for cross rolling cylindrical bodies and other uses, the combination of a plurality of revoluble housings, dies comprising interspaced helices carried by the housings for acting on the body to be treated, said helices having openings extending longitudinally therethrough, the walls of which form the working portions of the helices, and the helices being lapped by each other a sufficient amount to form a working pass between opposing working portions, and means for imparting orbital motion to the housings about the axis of the pass.

15. In a machine for cross rolling cylindrical bodies and other uses, the combination of a plurality of revoluble housings, dies comprising interspaced helices carried by the housings for acting on the body to be treated, said helices having openings extending longitudinally therethrough, the walls of which form the working portions of the helices, and the helices being lapped by each other a sufficient amount to form a working pass between opposing working portions, and means for rotating the housings about the axis of the pass.

16. In a machine for cross rolling cylindrical bodies and other uses, the combination of a plurality of housings, a helical die mounted on each housing, the convolutions of said helices being interspaced, said helices having openings extending longitudinally therethrough, the walls of which form the working portions of the helices and the helices being lapped by each other a sufficient amount to form a working pass between opposing working portions, and means for imparting orbital motion to the dies about the axis of the pass as a center.

17. In a machine for cross rolling cylindrical bodies and other uses, the combination of a plurality of housings, a helical die mounted on each housing, the convolutions of said helices being interspaced, said helices having openings extending longitudinally therethrough, the walls of which form the working portions of the helices, and the helices being lapped by each other a sufficient amount to form a working pass between opposing working portions and means for revolving the housings about the axis of the pass as a center.

18. In a machine for cross rolling cylindrical bodies and other uses, the combination of a plurality of housings, a helical die mounted on each housing, the convolutions of said helices being interspaced, said helices having openings extending longitudinally therethrough, the walls of which form the working portions of the helices and the helices being lapped by each other a sufficient amount to form a working pass between opposing working portions, means for imparting orbital motion to the dies about the axis of the pass as a center, and means for revolving the housings about the center of the pass as an axis.

19. In a machine for cross rolling or otherwise treating cylindrical bodies, the combination of a housing, a helix carried by the housing for acting on the body to be treated, said helix having a longitudinal opening, the walls of which form the working portions of the helix, an eccentric on which the housing turns, a tubular shaft or sleeve on which the eccentric is mounted, a concentric tubular shaft or sleeve for turning the housing on its said eccentric, and means for actuating the shafts or sleeves.

20. In a machine for cross rolling and otherwise treating cylindrical bodies, the combination of a housing carrying a helix for acting on the body to be treated, said helix having a longitudinal opening, the walls of which form the working portions of the helix, two concentric tubular shafts co-axial with the axis of the machine, an eccentric actuated by one said shaft and on which the housing is mounted to turn, and connections from the other said shaft for turning the housing.

21. In a machine for cross rolling or otherwise treating cylindrical bodies, a housing provided with hollow rotary shafts, concentric with each other and with the axis of the machine, and connections therefrom for giving respectively orbital and rotatory motion to the housing, a helix carried by the housing, said helix having a longitudinal opening, the walls of which form the working portions of the helix, and means for driving the said shafts.

22. In a machine for cross rolling cylindrical bodies and other uses, the combination of a plurality of oppositely located revoluble housings and dies carried by said housings, having their working faces opposite each other, said dies having openings extending longitudinally therefrom, the walls of which form the working portions of the dies, and the dies being lapped by each other a sufficient amount to form a working pass between opposing working portions.

23. In a machine for cross rolling cylindrical bodies and other uses, the combination of a plurality of eccentric revoluble housings, and working members for acting on the body to be treated carried by said housings, the working faces of said members being located opposite to each other, said members having openings extending longitudinally therethrough, the walls of which form the working portions of the members, and said members being lapped by each other a sufficient amount to form a working pass between opposing working portions.

24. In a machine for cross rolling cylindrical bodies and other uses, the combination of a plurality of revoluble and orbitally movable housings, and oppositely located dies carried by said housings, said dies having openings extending longitudinally therethrough, the walls of which form the working portions of the dies, and the dies being lapped by each other a sufficient amount to form a working pass between opposing working portions.

25. In a machine for cross rolling cylindrical bodies and other uses, the combination of a plurality of eccentric housings carrying dies or working members having spiral and oppositely placed working faces, said dies having openings extending longitudinally therethrough, the walls of which form the working portions of the dies, and the dies being lapped by each other a sufficient amount to form a working pass between opposing working portions.

26. In a machine for cross rolling cylindrical bodies and other uses, the combination of a plurality of eccentric housings carrying dies or working members, the working faces of which are diametrically opposed to each other, said dies having openings extending longitudinally therethrough, the walls of which form the working portions of the dies, and the dies being lapped by each other a sufficient amount to form a working pass between opposing working portions.

27. In a machine for cross rolling cylindrical bodies and other uses, the combination of two or more opposite dies or working members and means for rotating the respective members upon two different axes of rotation, said dies having openings extending longitudinally therethrough, the walls of which form the working portions of the dies, and the dies being lapped by each other a sufficient amount to form a working pass between opposing working portions.

In testimony whereof I have signed this specification in the presence of two subscribing witnesses.

LEONARD D. DAVIS.

Witnesses:
 Thos. C. Miller,
 George M. Mason.